J. F. REIGART.
Endless Driving Belts.

No. 145,447. Patented Dec. 9, 1873.

Witnesses.
J. M. Reigart.
A. F. Reigart.

J. Franklin Reigart,
Inventor.

UNITED STATES PATENT OFFICE.

J. FRANKLIN REIGART, OF WASHINGTON, DISTRICT OF COLUMBIA, ASSIGNOR TO HIMSELF AND EHUD N. DARLING, OF SAME PLACE.

IMPROVEMENT IN ENDLESS DRIVING-BELTS.

Specification forming part of Letters Patent No. 145,447, dated December 9, 1873; application filed May 10, 1873.

*To all whom it may concern:*

Be it known that I, J. FRANKLIN REIGART, of Washington city, District of Columbia, have invented an Improved Elastic-Ball Driving-Belt; and do hereby declare the following to be an exact description thereof, reference being had to the accompanying drawings, and to the letters of reference marked thereon, making a part of this specification, in which—

Figure 1:
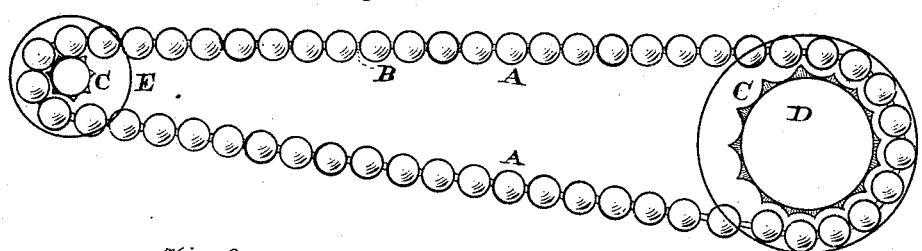
Figure 2:
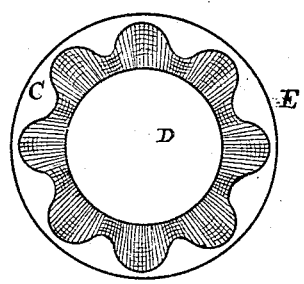
Figure 3:
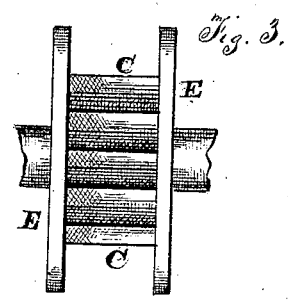
Figure 4:
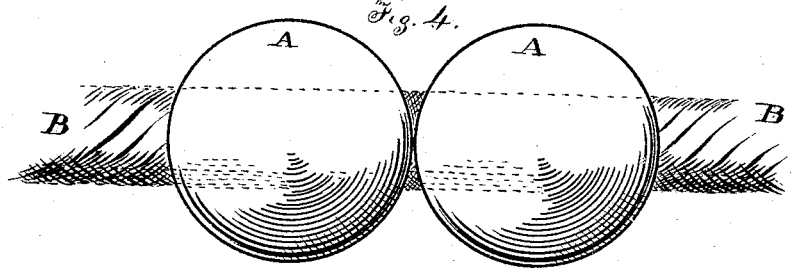

Figure 1 exhibits the belt revolving upon ridged or scalloped pulley-wheels. Fig. 2 is a side view of the ridged pulley. Fig. 3 is a front view of the pulley, showing the ridges or scallops on its face between the side flanges. Fig. 4 exhibits the elastic or india-rubber balls strung upon a hempen rope or wire cable, to form the endless belt.

The nature of my invention consists in the construction of an elastic-ball driving-belt, made of india-rubber balls of any required size, with a hempen rope or wire cable running through their centers, so as to form an endless belt.

The advantages of my invention are: It has a continuous motion, without any slip on the pulleys; it runs loosely on the pulleys, having less friction than the band belts; it operates as a toothed wheel, with a regular and perfect motion; it wears longer than the leather or india-rubber band belts, and not so liable to be torn, and more easily repaired, and has a decided advantage over the wide leather or india-rubber belts to propel heavy machinery or powerful shafting where belts of two feet in width are used, for when they break all the machinery has to be stopped, the belt being not only very expensive, but difficult to repair. Therefore, in place of a wide and expensive belt, I have three or four of my belts running beside each other—much less expensive, and perfectly free from slip, irregularity, or wear and tear; and any number of these propellers can operate, while radiating in every direction, from one main pulley-wheel, and from ten to one hundred feet in length, and at different distances, and occupy much less space in width. The balls, being strung loosely upon the cord or wire, allow the surface of the belt to yield and stretch, the balls jamming against each other, while the wire or cord is rigid and inelastic, and enables the belt to turn around sharp angles over small pulleys at a rapid rate; the shape of the balls, when jammed together, forming a miter, which, by means of the elasticity of the loose ball, entirely relieves the wire cord from strain.

A represents the balls, made of india-rubber or any elastic substance, with an aperture through the center of each. They are strung upon a strong rope or cable, B, made of any material. They may be made of any required size, and are intended to form an endless belt of any required length. I prefer the balls made of manufactured india-rubber, on account of their cheapness and elasticity, forming spherical teeth, perfectly uniform and regular, fitting into ridges or scallops C, that extend crosswise over the face of the pulley-wheels D, that operate as pinions, with flanges E on each side, so that the belt need not work tightly stretched, and cannot possibly slip. An endless belt, with spherical teeth, may be cast solid without the rope in the center; or it may be manufactured and woven in such shape; but when broken it could not be so easily repaired. This belt also acts as a brake to machinery, to check or reverse the motion.

What I claim as my invention, and desire to secure by Letters Patent, is—

An endless driving-belt constructed of a flexible cord or wire upon which are strung gum or other elastic balls, substantially as described.

J. FRANKLIN REIGART.

Witnesses:
J. M. REIGART,
DAN. F. REIGART.